US011963108B2

(12) United States Patent
He

(10) Patent No.: US 11,963,108 B2
(45) Date of Patent: Apr. 16, 2024

(54) POWER ALLOCATION METHOD AND TERMINAL DEVICE

(71) Applicant: GUANGDONG OPPO MOBILE TELECOMMUNICATIONS CORP., LTD., Guangdong (CN)

(72) Inventor: Chuanfeng He, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 461 days.

(21) Appl. No.: 17/340,000

(22) Filed: Jun. 5, 2021

(65) Prior Publication Data

US 2021/0297960 A1 Sep. 23, 2021

Related U.S. Application Data

(63) Continuation of application No. PCT/CN2019/084155, filed on Apr. 24, 2019.

(51) Int. Cl.
*H04W 52/36* (2009.01)
*H04L 1/1812* (2023.01)
(Continued)

(52) U.S. Cl.
CPC ......... *H04W 52/367* (2013.01); *H04L 1/1819* (2013.01); *H04L 1/1896* (2013.01); *H04W 52/28* (2013.01); *H04W 74/0833* (2013.01)

(58) Field of Classification Search
CPC ............... H04W 52/367; H04W 52/28; H04W 74/0833; H04W 52/146; H04W 52/281; H04W 52/50; H04W 72/0473; H04W 72/56; H04W 52/36; H04L 1/1819; H04L 1/1896
See application file for complete search history.

(56) References Cited

U.S. PATENT DOCUMENTS

2012/0281650 A1* 11/2012 Ouchi ............... H04W 72/0473
370/329
2014/0153534 A1 6/2014 Kim
(Continued)

FOREIGN PATENT DOCUMENTS

CN 101790236 A 7/2010
CN 102238716 A 11/2011
(Continued)

OTHER PUBLICATIONS

Second Office Action of the Chinese application No. 202110360905.X, dated Jun. 24, 2022.
(Continued)

*Primary Examiner* — Kiet Tang
(74) *Attorney, Agent, or Firm* — Perkins Coie LLP

(57) ABSTRACT

A power allocation method and terminal device are provided. The method includes: the terminal device determines a total transmitting power at a first transmitting moment, the total transmitting power is a sum of transmitting powers of multiple signals to be transmitted, the multiple signals to be transmitted at least comprise a first signal, the first signal comprises a PUSCH and/or a PRACH in a two-step random access process; when the total transmitting power is greater than a maximum transmitting power of the terminal device, the terminal device determines an actual transmitting power of the first signal according to the type of a cell sending the first signal and/or the channel type of the first signal, and a power allocation priority order, wherein the power allocation priority order includes the power allocation priority of the first signal and the power allocation priority order among other signals other than the first signal.

15 Claims, 8 Drawing Sheets

(51) Int. Cl.
*H04L 1/1867* (2023.01)
*H04W 52/28* (2009.01)
*H04W 74/0833* (2024.01)

(56) References Cited

U.S. PATENT DOCUMENTS

| | | | |
|---|---|---|---|
| 2014/0348078 | A1 | 11/2014 | Kim et al. |
| 2015/0319703 | A1* | 11/2015 | Kwon ................. H04W 52/281 370/329 |
| 2016/0044606 | A1 | 2/2016 | Yin |
| 2016/0157183 | A1 | 6/2016 | Kim et al. |
| 2017/0064646 | A1 | 3/2017 | Kim et al. |
| 2018/0279376 | A1 | 9/2018 | Dinan et al. |
| 2019/0357265 | A1 | 11/2019 | Ren et al. |

FOREIGN PATENT DOCUMENTS

| | | |
|---|---|---|
| CN | 103765966 A | 4/2014 |
| CN | 106537997 A | 3/2017 |
| CN | 107197512 A | 9/2017 |
| CN | 108174438 A | 6/2018 |
| WO | 2016022600 A1 | 2/2016 |
| WO | 2018127239 A1 | 7/2018 |

OTHER PUBLICATIONS

First Office Action of the European application No. 19925617.3, dated Jul. 28, 2022.
Notice of Rejection of the Chinese application No. 202110360905.X, dated Sep. 13, 2022.
First Office Action of the Chinese application No. 202110360905.X, dated Mar. 30, 2022. 17 pages with English translation.
Supplementary European Search Report in the European application No. 19925617.3, dated Nov. 12, 2021. 10 pages.
Written Opinion of the International Search Authority in the international application No. PCT/CN2019/084155, dated Jan. 23, 2020. 7 pages with English translation.
International Search Report in the international application No. PCT/CN2019/084155, dated Jan. 23, 2020.

* cited by examiner

300

```
┌─────────────────────────────────────────────────────────┐
│ A terminal device determines total transmit power at a first │
│ transmission occasion, the total transmit power being a sum of │
│ transmit power for a plurality of signals to be transmitted, the │
│ plurality of signals to be transmitted at least including at least one of a │──  S310
│ PUSCH or PRACH in a 2-step random access process, and a PRACH │
│ in a 4-step random access process │
└─────────────────────────────────────────────────────────┘
                              │
┌─────────────────────────────────────────────────────────┐
│ Responsive to that the total transmit power is higher than maximum │
│ transmit power of the terminal device, the terminal device determines │
│ actual transmit power for the plurality of signals to be transmitted │
│ according to a power allocation priority order respectively, wherein in │──  S320
│ the power allocation priority order, at least one of a power allocation │
│ priority of the PUSCH or a power allocation priority of the PRACH │
│ in the 2-step random access process is higher than a power allocation │
│ priority of the PRACH in the 4-step random access process of a PCell │
└─────────────────────────────────────────────────────────┘
```

FIG. 3

POWER ALLOCATION METHOD AND TERMINAL DEVICE

CROSS-REFERENCE TO RELATED APPLICATION

This is a continuation application of International Patent Application No. PCT/CN2019/084155, filed on Apr. 24, 2019, entitled "Power Allocation Method and Terminal Device", the disclosure of which is hereby incorporated by reference in its entirety.

BACKGROUND

In a New Radio (NR) system, a power allocation priority order for power allocation of different Uplink (UL) channels or signals (for example, a Physical Uplink Shared Channel (PUSCH), a Physical Uplink Control Channel (PUCCH), a Physical Random Access Channel (PRACH) and a Sounding Reference Signal (SRS)) is defined. When a calculated power sum of the UL channels or signals exceeds maximum transmit power of a terminal device, power allocation is performed according to the power allocation priority order. That is, power is preferentially allocated to a channel or signal with a high priority, and power for a channel or signal with a low priority may be compressed, to ensure that transmit power of the terminal device is less than or equal to the maximum transmit power of the terminal device. It is specified in Release 15 (Rel 15) that, in the power allocation priority order, a power allocation priority of PRACH transmission (i.e., a Message (Msg) 1) in a 4-step random access process is highest and a power allocation priority of PUSCH transmission (i.e., an Msg 3) in the 4-step random access process is lower. The NR system supports 2-step random access simultaneously. In a 2-step random access process, if the power allocation priority order specified in Rel 15 is retained, when power for a PUSCH part in an Msg A in the 2-step random access process is compressed because a power allocation priority thereof is low, the Msg A in the 2-step random access process may not be correctly received by a network device, which results in retransmission of the Msg A in the 2-step random access process and increase of a delay of 2-step random access.

SUMMARY

Embodiments of the disclosure relate to the field of communication, and more particularly to a method for power allocation and a terminal device, to ensure a power allocation priority of an Msg A, which avoids the situation that the Msg A is retransmitted because the Msg A cannot be correctly received by a network device, and reduces a delay of 2-step random access.

According to a first aspect, there is provided a method for power allocation. The method may include the following operations.

A terminal device determines total transmit power at a first transmission occasion, the total transmit power being a sum of transmit power for a plurality of signals to be transmitted, the plurality of signals to be transmitted at least including a first signal, and the first signal including at least one of a PUSCH or PRACH in a 2-step random access process.

Responsive to that the total transmit power is higher than maximum transmit power of the terminal device, the terminal device determines actual transmit power for the first signal according to a power allocation priority order as well as at least one of a type of a cell for transmitting the first signal or a channel type of the first signal, the power allocation priority order including an order of power allocation priorities of the first signal and other signals except the first signal.

It is to be noted that the first signal may be an Msg A in the 2-step random access process.

According to a second aspect, there is provided a method for power allocation. The method may include the following operations.

A terminal device determines total transmit power at a first transmission occasion, the total transmit power being a sum of transmit power for a plurality of signals to be transmitted, the plurality of signals to be transmitted at least including at least one of a PUSCH or PRACH in a 2-step random access process, and a PRACH in a 4-step random access process.

Responsive to that the total transmit power is higher than maximum transmit power of the terminal device, the terminal device determines actual transmit power for the plurality of signals to be transmitted according to a power allocation priority order respectively, wherein in the power allocation priority order, at least one of a power allocation priority of the PUSCH or a power allocation priority of the PRACH in the 2-step random access process is higher than a power allocation priority of the PRACH in the 4-step random access process of a Primary Cell (PCell).

According to a third aspect, there is provided a terminal device. The terminal device is configured to execute the method in the first aspect or each implementation mode thereof.

Specifically, the terminal device includes function modules which are configured to execute the method in the first aspect or each implementation mode thereof.

According to a fourth aspect, there is provided a terminal device. The terminal device is configured to execute the method in the second aspect or each implementation mode thereof.

Specifically, the terminal device includes function modules which are configured to execute the method in the second aspect or each implementation mode thereof.

According to a fifth aspect, there is provided a terminal device, which may include a processor and a memory. The memory may be configured to store a computer program, and the processor may be configured to call and run the computer program stored in the memory to execute the method in the first aspect or each implementation mode thereof.

According to a sixth aspect, there is provided a terminal device, which may include a processor and a memory. The memory may be configured to store a computer program, and the processor may be configured to call and run the computer program stored in the memory to execute the method in the second aspect or each implementation mode thereof.

According to a seventh aspect, there is provided an apparatus. The apparatus may be configured to implement the method in any aspect of the first aspect to the second aspect or each implementation mode thereof.

Specifically, the apparatus may include a processor, which is configured to call and run a computer program in a memory to enable a device installed with the apparatus to execute the method in any aspect of the first aspect to the second aspect or each implementation mode thereof.

According to an eighth aspect, there is provided a computer-readable storage medium, which may be configured to store a computer program, the computer program enabling a computer to execute the method in any aspect of the first aspect to the second aspect or each implementation mode thereof.

According to a ninth aspect, there is provided a computer program product, which includes computer program instructions, the computer program instructions enabling a computer to execute the method in any aspect of the first aspect to the second aspect or each implementation mode thereof.

According to a tenth aspect, there is provided a computer program, which may run on a computer to enable the computer to execute the method in any aspect of the first aspect to the second aspect or each implementation mode thereof.

BRIEF DESCRIPTION OF THE DRAWINGS

FIG. 3 is a schematic flowchart of another method for power allocation according to an embodiment of the disclosure.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art for the embodiments in the disclosure without creative work shall fall within the scope of protection of the disclosure.

The embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, an NR system, an evolved system of the NR system, an LTE-based access to unlicensed spectrum (LTE-U) system, an NR-based access to unlicensed spectrum (NR-U) system, a Universal Mobile Telecommunication System (UMTS), a Wireless Local Area Network (WLAN) and a Wireless Fidelity (WiFi), a next-generation communication system or another communication system.

Generally speaking, connections supported by a conventional communication system are usually limited in number and also easy to implement. However, with the development of communication technologies, a mobile communication system will not only support conventional communication but also support, for example, Device to Device (D2D) communication, Machine to Machine (M2M) communication, Machine Type Communication (MTC) and Vehicle to Vehicle (V2V) communication. The embodiments of the disclosure may also be applied to these communication systems.

Optionally, the communication system in the embodiments of the disclosure may be applied to a Carrier Aggregation (CA) scenario, may also be applied to a Dual Connectivity (DC) scenario and may further be applied to a Standalone (SA) network deployment scenario.

An applied spectrum is not limited in the embodiments of the disclosure. For example, the embodiments of the disclosure may be applied to a licensed spectrum or may be applied to an unlicensed spectrum.

Figure 1:
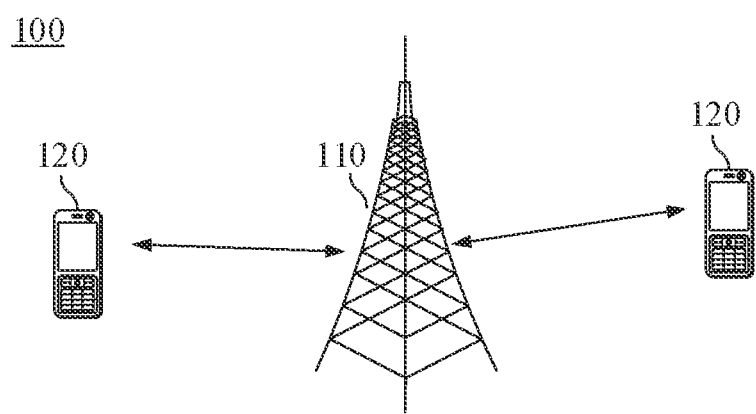
FIG. 1 is a schematic diagram of an architecture of a communication system according to an embodiment of the disclosure.

Exemplarily, a communication system 100 that the embodiments of the disclosure are applied to is illustrated in FIG. 1. The communication system 100 may include a network device 110, and the network device 110 may be a device communicating with a terminal device 120 (or called a communication terminal and a terminal). The network device 110 may provide a communication coverage for a specific geographical region, and may communicate with a terminal device located in the coverage.

A network device and two terminal devices are exemplarily illustrated in FIG. 1. Optionally, the communication system 100 may include a plurality of network devices, and another number of terminal devices may be included in coverage of each network device. No limits are made thereto in the embodiments of the disclosure.

Optionally, the communication system 100 may further include other network entities such as a network controller and a mobility management entity. No limits are made thereto in the embodiments of the disclosure.

It is to be understood that a device with a communication function in the network/system in the embodiments of the disclosure may be called a communication device. Take the communication system 100 illustrated in FIG. 1 for an example, communication devices may include the network device 110 and terminal device 120 with the communication function. The network device 110 and the terminal device 120 may be the specific devices mentioned above and will not be elaborated herein. The communication devices may further include other devices in the communication system 100, for example, other network entities such as a network controller and a mobility management entity. No limits are made thereto in the embodiments of the disclosure.

It is to be understood that terms "system" and "network" in the disclosure may usually be exchanged in the disclosure. In the disclosure, term "and/or" is only an association relationship describing associated objects and repretransmitteds that three relationships may exist. For example, A and/or B may repretransmitted three conditions: i.e., independent existence of A, existence of both A and B and independent existence of B. In addition, character "/" in the disclosure usually repretransmitteds that previous and next associated objects form an "or" relationship.

Each of the embodiments of the disclosure is described in combination with the terminal device and the network device. The terminal device may also be called User Equipment (UE), an access terminal, a user unit, a user Station (ST), a mobile ST, a mobile radio ST, a remote ST, a remote terminal, a mobile device, a user terminal, a terminal, a wireless communication device, a user agent or a user device, etc. The terminal device may be an ST in the WLAN, and may be a cell phone, a cordless phone, a Session Initiation Protocol (SIP) phone, a Wireless Local Loop (WLL) ST, a Personal Digital Assistant (PDA), a handheld device with a wireless communication function, a computing device, another processing device connected to a wireless modem, a vehicle device, a wearable device, a terminal device in a next-generation communication system, for example, an NR network, a terminal device in a future evolved Public Land Mobile Network (PLMN) or the like.

Exemplarily but unlimitedly, in the embodiments of the disclosure, the terminal device may also be a wearable device. The wearable device may also be called a wearable intelligent device and is a generic term of wearable devices obtained by performing intelligent designing and development on daily wearing products, for example, glasses, gloves, watches, clothes and shoes. The wearable device is a portable device directly worn or integrated to clothes or accessory of a user. The wearable device not only is a hardware device but also realizes powerful functions through software support, data interaction and cloud interaction. Generalized wearable intelligent device includes, for example, intelligent watches or intelligent glasses with complete functions and large sizes and capable of realizing all or part of functions independently of intelligent phones, and for example, various types of intelligent bands and intelligent jewelries of which each is dedicated to application functions of a certain type and required to be matched with other devices such as intelligent phones for use.

The network device may be a device configured to communicate with a mobile device, and the network device may be an Access Point (AP) in the WLAN, a Base Transceiver Station (BTS) in the GSM or CDMA, may also be a NodeB (NB) in WCDMA, and may further be an Evolutional Node B (eNB or eNodeB) in LTE, or a relay ST or AP, or a vehicle device, a wearable device, a network device or base ST (a gNB) in the NR network, a network device in the future evolved PLMN or the like.

In the embodiments of the disclosure, the network device provides service for a cell, and the terminal device communicates with the network device through a transmission resource (for example, a frequency-domain resource or a spectrum resource) for the cell. The cell may be a cell corresponding to the network device (for example, a base station, BS), the cell may belong to a macro BS, or a BS corresponding to a small cell. Here, the small cell may include: a metro cell, a micro cell, a pico cell, a femto cell and the like. These small cells have the characteristics of small coverage and low transmit power, and are suitable for providing high-rate data transmission service.

Under the situation that two or more UL carriers are configured for a single cell or CA is configured for a single cell, the terminal device may transmit channels or signals such as a PUSCH, a PUCCH, a PRACH and an SRS on the two or more UL carriers at the same transmission occasion. The terminal device may determine transmit power for these channels or signals respectively. However, the maximum transmit power of the terminal device is limited. If a power sum of respective channels or signals on respective UL carriers is greater than the maximum transmit power of the terminal device, a certain extent of power compression needs to be performed on the power for part or all of the UL channels or signals, to meet the maximum transmit power of the terminal device for transmitting.

A power allocation priority order for power allocation of different UL channels or signals is defined in 5-Generation (5G) NR. When a calculated power sum of the UL channels or signals exceeds maximum transmit power of a terminal device, power allocation is performed according to the specified power allocation priority order. That is, power is preferentially allocated to a channel or signal with a high priority, and power for a channel or signal with a low priority may be compressed, to ensure that transmit power of the terminal device is less than or equal to the maximum transmit power of the terminal device.

A power allocation priority order defined in a Rel-15 standard is as follows. Power allocation priorities are sequentially arranged from high to low as follows:

PRACH transmission on a PCell;

PUCCH transmission with Hybrid Automatic Repeat request Acknowledgement (HARQ-ACK) information and/or Scheduling Request (SR), or PUSCH transmission with HARQ-ACK information;

PUCCH transmission with Channel State Information (CSI) or PUSCH transmission with CSI;

PUSCH transmission without HARQ-ACK information or CSI; and

SRS transmission, with aperiodic SRS having higher priority than semi-persistent and/or periodic SRS, or PRACH transmission on a serving cell other than the PCell.

It can be seen that the power allocation priority of PRACH transmission on the PCell is highest and the power allocation priority of PRACH transmission on a non-PCell or SRS transmission is lowest.

In a CA scenario, when signals on different carriers or power allocation priorities of the signals are the same, the terminal device may preferentially allocate power to a signal on a PCell of a Master Cell Group (MCG) or a signal on a Primary Secondary Cell (PSCell) of a Secondary Cell Group (SCG), and then to a Secondary Cell (SCell) of the MCG or the SCG. Moreover, between the PCell of the MCG and the PSCell of the SCG, power is preferentially allocated to the PCell of the MCG and then to the PSCell of the SCG. In a scenario that two UL carriers are configured for a single cell, the terminal device may preferentially allocate power to a signal on a carrier configured to transmit a PRACH. If no carrier is configured to transmit a PUCCH, the terminal device may preferentially allocate power to a non-supplementary UL carrier.

In the power allocation priority order defined in Rel 15, a power allocation priority of a PRACH (i.e., an Msg 1) in a 4-step random access process is highest, and a priority of a PUSCH (i.e., an Msg 3) in the 4-step random access process is lower. This is because the Msg 3 in the 4-step random access process supports retransmission and can be retransmitted even if not being correctly received by a BS due to power compression. In a 2-step random access process, an Msg A actually includes the Msg 1 and Msg 3 in the 4-step random access process, namely including two parts, i.e., a preamble and the PUSCH. If the existing power allocation priority order is retained, when power for the PUSCH part in the Msg A is compressed because a power allocation priority thereof is low, the Msg A may not be correctly received by the BS, which results in retransmission of the Msg A and increase of a delay of the 2-step random access process. Moreover, retransmission power ramping causes additional UL interference and waste of Random Access Channel (RACH) resource.

Based on the foregoing problems, the disclosure provides a power allocation solution, which may ensure a power allocation priority of an Msg A in a 2-step random access process and avoid the situation that the Msg A is retransmitted because the Msg A in the 2-step random access process cannot be correctly received by a BS.

The power allocation solution designed for the foregoing problems in the disclosure will be described below in detail.

Figure 2:
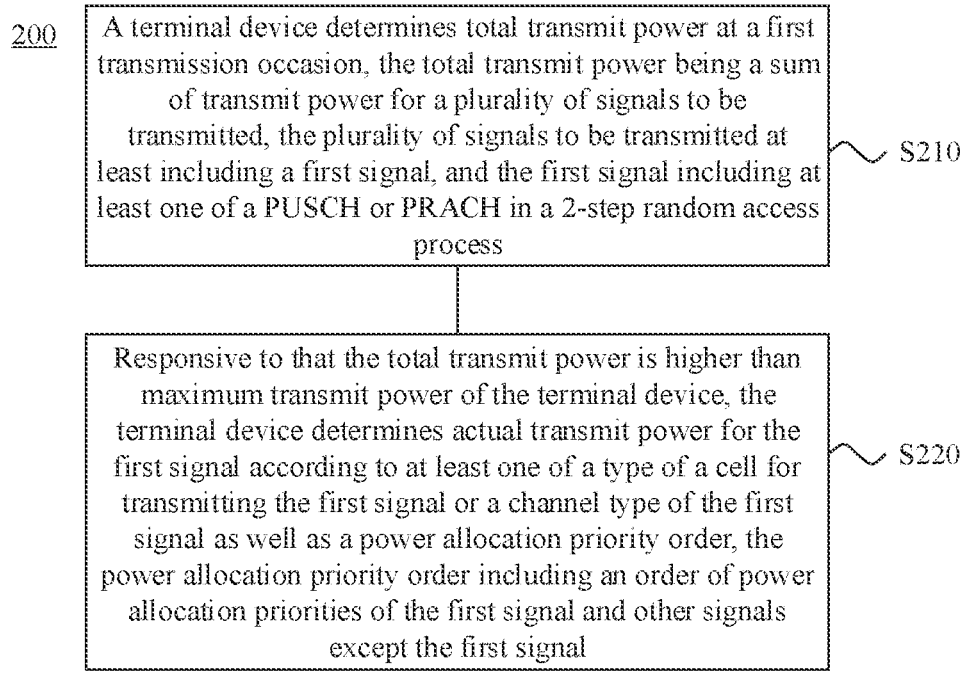
FIG. 2 is a schematic flowchart of a method for power allocation according to an embodiment of the disclosure.

FIG. 2 is a schematic flowchart of a method for power allocation 200 according to an embodiment of the disclosure. As illustrated in FIG. 2, the method 200 may include the following operations.

In S210, a terminal device determines total transmit power at a first transmission occasion, the total transmit power being a sum of transmit power for a plurality of signals to be transmitted, and the plurality of signals to be transmitted at least including a first signal, and the first signal including at least one of a PUSCH or PRACH in a 2-step random access process.

In S220, responsive to that the total transmit power is higher than maximum transmit power of the terminal device, the terminal device determines actual transmit power for the first signal according to at least one of a type of a cell for transmitting the first signal or a channel type of the first signal as well as a power allocation priority order, the power allocation priority order including an order of power allocation priorities of the first signal and other signals except the first signal.

Optionally, in the embodiment of the disclosure, the plurality of signals to be transmitted may include, but not limited to, a PUSCH, a PUCCH, a PRACH, an SRS and the like. Descriptions are made with the condition that the signal to be transmitted is the PUCCH as an example. It is to be understood that transmitting the PUCCH can be understood as transmitting data carried on the PUCCH, or allocating a transmission resource to the PUCCH, or transmitting the data on the PUCCH on the transmission resource.

Optionally, the power allocation priority order may be pre-configured.

For example, in the power allocation priority order, a power allocation priority order defined in a Rel-15 standard may be adopted for power allocation priorities of the signals except the first signal. Specifically, the power allocation priorities are sequentially arranged from high to low as follows:

PRACH transmission on a PCell;
PUCCH transmission with HARQ-ACK information and/or SR or PUSCH transmission with HARQ-ACK information:
PUCCH transmission with CSI or PUSCH transmission with CSI;
PUSCH transmission without HARQ-ACK information or CSI; and
SRS transmission, with aperiodic SRS having higher priority than semi-persistent and/or periodic SRS, or PRACH transmission on a serving cell other than the PCell.

It is to be noted that, in the embodiment of the disclosure, transmitting the PRACH in the 2-step random access process may be understood as transmitting a preamble carried on the PRACH, and transmitting the PUCCH in the 2-step random access process may be understood as transmitting a payload carried on the PUCCH.

In the embodiment of the disclosure, the terminal device may determine the total transmit power at the first transmission occasion in many manners, and no limits are made thereto in the disclosure. For example, the terminal device may calculate the transmit power for the plurality of signals to be transmitted according to an existing signal power calculation method respectively, and then may sum the transmit power for respective signals to be transmitted to obtain the total transmit power at the first transmission occasion.

It is to be noted that the total transmit power at the first transmission occasion is not actual transmit power of the terminal device at the first transmission occasion, and the total transmit power at the first transmission occasion is higher than or equal to the actual transmit power at the first transmission occasion.

It is to be noted that the maximum transmit power of the terminal device may be absolute maximum transmit power $P_{CMAX}(i)$ of the terminal device or may be a linear value of the absolute maximum transmit power, i.e., $\hat{P}_{CMAX}(i)$ in a standard.

For example, the maximum transmit power of the terminal device is $\hat{P}_{CMAX}(i)$. Under the situation that two or more than two UL carriers are configured for a single cell or CA is configured for a single cell, if total transmit power of the terminal device to transmit a PUSCH/PUCCH/PRACH/SRS in a transmission opportunity i will exceed $\hat{P}_{CMAX}(i)$, $\hat{P}_{CMAX}(i)$ being a linear value of $\hat{P}_{CMAX}(i)$, the terminal device may allocate transmit power to the PUSCH/PUCCH/PRACH/SRS according to the power allocation priority order, to make transmit power of the terminal device in each symbol of the transmission opportunity i less than or equal to $\hat{P}_{CMAX}(i)$.

When the total transmit power at the first transmission occasion is higher than the maximum transmit power of the terminal device, the terminal device needs to compress all or part of the plurality of signals to be transmitted. That is, the terminal device redetermines actual transmit power for the signals to be transmitted, including redetermining the actual transmit power for the first signal, to meet a limit of the maximum transmit power of the terminal device.

When determining the actual transmit power for the first signal, the terminal device may determine the actual transmit power for the first signal according to the power allocation priority order. The actual transmit power for the first signal may be less than or equal to transmit power for the first signal before transmit power redetermination.

It is to be understood that, in the embodiment of the disclosure, the transmit power may also be called sending power.

Optionally, after the terminal device determines the actual transmit power for the first signal according to the type of the cell for transmitting the first signal and/or the channel type of the first signal as well as the power allocation priority order, the terminal device may transmit the first signal based on the actual transmit power for the first signal.

Of course, in the embodiment of the disclosure, the terminal device may also determine the actual transmit power for the plurality of signals to be transmitted according to the power allocation priority order respectively. After determining the actual transmit power for the plurality of signals to be transmitted, the terminal device may transmit the plurality of signals to be transmitted based on the actual transmit power for each signal to be transmitted.

It is to be understood that a random access process on a PCell is mainly used for random access, and a random access process on a non-PCell is mainly used for Time Advance (TA) adjustment.

It is to be noted that, in the embodiment of the disclosure, the plurality of signals to be transmitted may at least include the first signal on the PCell and/or the first signal on the non-PCell, and the first signal includes a PUSCH and/or a PRACH.

In the embodiment of the disclosure, the type of the cell for transmitting the first signal may be the PCell or may be the non-PCell.

It is to be noted that, in the embodiment of the disclosure, the PCell is a PCell of an MCG, and the non-PCell is a PSCell of an SCG, an SCell of the MCG and an SCell of the SCG.

A First Embodiment

The actual transmit power for the first signal is determined by the terminal device according to the channel type of the first signal and the power allocation priority order.

Optionally, in the first embodiment, the PRACH and PUSCH included in the first signal have different power allocation priorities.

Optionally, the power allocation priority of the PRACH included in the first signal is higher than the power allocation priority of the PUSCH included in the first signal.

For example, the power allocation priority of the PUSCH included in the first signal is higher than or equal to a power allocation priority of a PRACH in a 4-step random access process on the PCell.

For another example, the power allocation priority of the PUSCH included in the first signal is lower than the power allocation priority of the PRACH in the 4-step random access process on the PCell.

For another example, the power allocation priority of the PRACH included in the first signal is higher than the power allocation priority of the PRACH in the 4-step random access process on the PCell.

For still another example, at least one of the power allocation priority of the PRACH or the power allocation priority of the PUSCH included in the first signal is higher than a power allocation priority of a PRACH in a 4-step random access process on the non-PCell.

In the first embodiment, for example, the power allocation priorities in the power allocation priority order are sequentially arranged from high to low as follows:
  the PRACH included in the first signal:
  the PRACH in the 4-step random access process on the PCell, or the PUSCH included in the first signal:
  PUCCH transmission with HARQ-ACK information and/or SR, or PUSCH transmission with HARQ-ACK information;
  PUCCH transmission with CSI or PUSCH transmission with CSI:
  the first signal (the PRACH and/or PUSCH) on the non-PCell;
  PUCCH transmission without HARQ-ACK information or PUSCH transmission without CSI; and
  an SRS, or the PRACH in the 4-step random access process on the non-PCell.

In the first embodiment, since different transmission manners and corresponding detection manners are adopted for different channel types, different channels in the Msg A have different power allocation priorities. The power allocation priorities may be determined for different channel types respectively, and power allocation may be optimized for each channel type, such that a high total success rate of the Msg A is achieved and the delay of 2-step random access is reduced.

Furthermore, retransmission of the Msg A leads to power ramping, and power ramping may cause UL interference. That is, avoiding retransmission of the Msg A may avoid generating additional UL interference and also avoids waste of PRACH and PUSCH resources.

A Second Embodiment

The actual transmit power for the first signal is determined by the terminal device according to the type of the cell for transmitting the first signal, the channel type of the first signal and the power allocation priority order.

Specifically, the PRACH and PUSCH included in the first signal on the PCell have different power allocation priorities.

For example, the power allocation priority of the PRACH included in the first signal on the PCell is higher than the power allocation priority of the PUSCH included in the first signal on the PCell.

Optionally, the PRACH and PUSCH included in the first signal on the non-PCell have different power allocation priorities.

For example, the power allocation priority of the PRACH included in the first signal on the non-PCell is higher than the power allocation priority of the PUSCH included in the first signal on the non-PCell.

Optionally, the PRACH and PUSCH included in the first signal on the non-PCell may have the same power allocation priority.

Optionally, in the second embodiment, the power allocation priority of the PRACH and/or the power allocation priority of the PUSCH included in the first signal on the PCell are/is higher than the power allocation priority of the PRACH and/or the power allocation priority of the PUSCH included in the first signal on the non-PCell.

Optionally, in the second embodiment, in the power allocation priority order,
  the power allocation priority of the PRACH included in the first signal on the PCell is higher than or equal to the power allocation priority of the PRACH in the 4-step random access process on the PCell, and the power allocation priority of the PUSCH included in the first signal on the PCell is lower than the power allocation priority of the PRACH in the 4-step random access process on the PCell; or
  the power allocation priority of the PRACH included in the first signal on the PCell is higher than the power allocation priority of the PRACH in the 4-step random access process on the PCell, and the power allocation priority of the PUSCH included in the first signal on the PCell is less than or equal to the power allocation priority of the PRACH in the 4-step random access process on the PCell.

Optionally, in the second embodiment, in the power allocation priority order, at least one of the power allocation priority of the PRACH or the power allocation priority of the PUSCH included in the first signal on the PCell is higher than at least one of:
  the power allocation priority of PUCCH transmission with HARQ-ACK information and/or SR, or the power allocation priority of PUSCH transmission with HARQ-ACK information;
  the power allocation priority of PUCCH transmission with CSI or the power allocation priority of PUSCH transmission with CST;
  the power allocation priority of the first signal on the non-PCell;
  the power allocation priority of PUSCH transmission without HARQ-ACK information or the power allocation priority of PUSCH transmission without CSI; or
  the power allocation priority of the SRS or the power allocation priority of the PRACH in the 4-step random access process on the non-PCell.

Optionally, in the second embodiment, in the power allocation priority order, at least one of the power allocation priority of the PRACH or the power allocation priority of the PUSCH included in the first signal on the non-PCell is lower than at least one of;

the power allocation priority of the PRACH and/or the power allocation priority of the PUSCH included in the first signal on the PCell:
the power allocation priority of the PRACH in the 4-step random access process on the PCell;
the power allocation priority of PUCCH transmission with HARQ-ACK information and/or SR, or the power allocation priority of PUSCH transmission with HARQ-ACK information; or
the power allocation priority of PUCCH transmission with CSI or the power allocation priority of PUSCH transmission with CSI.

Optionally, in the second embodiment, in the power allocation priority order, at least one of the power allocation priority of the PRACH or the power allocation priority of the PUSCH included in the first signal on the non-PCell is higher than at least one of:
the power allocation priority of PUSCH transmission without HARQ-ACK information, or the power allocation priority of PUSCH transmission without CSI; or
the power allocation priority of the SRS, or the power allocation priority of the PRACH in the 4-step random access process on the non-PCell.

In the second embodiment, for example, the power allocation priorities in the power allocation priority order are sequentially arranged from high to low as follows:
the PRACH included in the first signal on the PCell;
the PRACH in the 4-step random access process on the PCell, or the PUSCH included in the first signal on the PCell;
PUCCH transmission with HARQ-ACK information and/or SR, or PUSCH transmission with HARQ-ACK information;
PUCCH transmission with CSI or PUSCH transmission with CSI;
the PRACH included in the first signal on the non-PCell;
the PUSCH included in the first signal on the non-PCell;
PUCCH transmission without HARQ-ACK information, or PUSCH transmission without CSI; and
the SRS, or the PRACH in the 4-step random access process on the non-PCell.

In the second embodiment, a power allocation priority of the Msg A is defined in two dimensions of the channel type and the type of the cell, so that the power allocation priority may be optimized better, the total success rate of the Msg A is high, and the delay of 2-step random access is reduced.

Furthermore, retransmission of the Msg A leads to power ramping, and power ramping may cause UL interference. That is, avoiding retransmission of the Msg A may avoid generating additional UL interference and also avoids waste of the PRACH and PUSCH resources. UL interference and waste of the PRACH and PUSCH resources are reduced.

A Third Embodiment

The actual transmit power for the first signal is determined by the terminal device according to the type of the cell for transmitting the first signal and the power allocation priority order.

Specifically, the power allocation priority of the first signal on the PCell is higher than the power allocation priority of the first signal on the non-PCell.

Optionally, in the third embodiment, in the power allocation priority order, the power allocation priority of the first signal on the non-PCell is less than or equal to the power allocation priority of the PRACH in the 4-step random access process on the PCell.

Optionally, in the third embodiment, in the power allocation priority order, the power allocation priority of the first signal on the non-PCell is higher than or equal to at least one of:
the power allocation priority of PUSCH transmission without HARQ-ACK information or the power allocation priority of PUSCH transmission without CSI;
the power allocation priority of PUSCH transmission with HARQ-ACK information or the power allocation priority of PUSCH transmission with CSI;
the power allocation priority of the SRS; or
the power allocation priority of the PRACH in the 4-step random access process on the non-PCell.

Optionally, in the third embodiment, in the power allocation priority order, the power allocation priority of the first signal on the non-PCell is less than or equal to at least one of:
the power allocation priority of PUCCH transmission with HARQ-ACK information and/or SR, or the power allocation priority of PUSCH transmission with HARQ-ACK information; or
the power allocation priority of PUCCH transmission with CSI or the power allocation priority of PUSCH transmission with CSI.

Optionally, in the third embodiment, in the power allocation priority order, the power allocation priority of the first signal on the PCell is higher than or equal to the power allocation priority of the PRACH in the 4-step random access process on the PCell, and/or the power allocation priority of the first signal on the non-PCell is higher than or equal to the power allocation priority of the PRACH in the 4-step random access process on the non-PCell.

Optionally, in the third embodiment, in the power allocation priority order, the power allocation priority of the first signal on the PCell is higher than at least one of:
the power allocation priority of the PRACH in the 4-step random access process on the PCell;
the power allocation priority of PUCCH transmission with HARQ-ACK information and/or SR, or the power allocation priority of PUSCH transmission with HARQ-ACK information;
the power allocation priority of PUCCH transmission with CSI or the power allocation priority of PUSCH transmission with CSI;
the power allocation priority of the first signal on the non-PCell;
the power allocation priority of PUSCH transmission without HARQ-ACK information or the power allocation priority of PUSCH transmission without CSI; or
the power allocation priority of the SRS or the power allocation priority of the PRACH in the 4-step random access process on the non-PCell.

In the third embodiment, for example, the power allocation priorities in the power allocation priority order are sequentially arranged from high to low as follows:
the first signal on the PCell;
the PRACH in the 4-step random access process on the PCell;
PUCCH transmission with HARQ-ACK information and/or SR, or PUSCH transmission with HARQ-ACK information;
PUCCH transmission with CSI or PUSCH transmission with CSI;
the first signal on the non-PCell;
PUCCH transmission without HARQ-ACK information or PUSCH transmission without CSI; and the SRS, or the PRACH in the 4-step random access process on the non-PCell.

In the third embodiment, the power allocation priority for transmitting the Msg A on the PCell is ensured, which avoids the situation that the Msg A is retransmitted because the Msg A cannot be correctly received by a network device, and reduces the delay of 2-step random access.

Furthermore, retransmission of the Msg A leads to power ramping, and power ramping may cause UL interference. That is, avoiding retransmission of the Msg A may avoid generating additional UL interference and also avoids waste of the PRACH and PUSCH resources. UL interference and waste of the PRACH and PUSCH resources are reduced.

Accordingly, in the embodiment of the disclosure, the terminal device determines the actual transmit power for the first signal according to the type of the cell for transmitting the first signal and/or the channel type of the first signal as well as the power allocation priority order, so that the power allocation priority of the first signal may be ensured, which avoids the situation that the first signal is retransmitted because the first signal cannot be correctly received by the network device, reduces the delay of 2-step random access, and also avoids waste of the PUSCH resource and/or the PRACH resource.

FIG. 3 is a schematic flowchart of a method for power allocation 300 according to an embodiment of the disclosure. As illustrated in FIG. 3, the method 300 may include the following operations.

In S310, a terminal device determines total transmit power at a first transmission occasion, the total transmit power being a sum of transmit power for a plurality of signals to be transmitted, the plurality of signals to be transmitted at least including at least one of a PUSCH or PRACH in a 2-step random access process, and a PRACH in a 4-step random access process.

In S320, responsive to that the total transmit power is higher than maximum transmit power of the terminal device, the terminal device determines actual transmit power for the plurality of signals to be transmitted according to a power allocation priority order respectively, wherein in the power allocation priority order, at least one of a power allocation priority of the PUSCH or a power allocation priority of the PRACH in the 2-step random access process is higher than a power allocation priority of the PRACH in the 4-step random access process on a PCell.

Optionally, in the embodiment of the disclosure, the plurality of signals to be transmitted may include, but not limited to, a PUSCH, a PUCCH, a PRACH, an SRS and the like. Descriptions are made with the condition that the signal to be transmitted is the PUCCH as an example. It is to be understood that transmitting the PUCCH can be understood as transmitting data carried on the PUCCH, or allocating a transmission resource to the PUCCH, or transmitting the data on the PUCCH on the transmission resource.

It is to be noted that, in the embodiment of the disclosure, transmitting the PRACH in the 2-step random access process may be understood as transmitting a preamble carried on the PRACH, and transmitting the PUCCH in the 2-step random access process may be understood as transmitting a payload carried on the PUCCH.

Optionally, in the embodiment of the disclosure, in the power allocation priority order, at least one of the power allocation priority of the PRACH or the power allocation priority of the PUSCH in the 2-step random access process is higher than the power allocation priority of the PRACH in the 4-step random access process on the PCell.

It is to be noted that, in the embodiment of the disclosure, the PCell is a PCell of an MCG, and the non-PCell is a PSCell of an SCG, an SCell of the MCG and an SCell of the SCG.

Optionally, in the power allocation priority order, at least one of the power allocation priority of the PUSCH or the power allocation priority of the PRACH in the 2-step random access process on the PCell and/or the non-PCell is higher than at least one of:
- a priority of the PRACH in the 4-step random access process on the PCell;
- a power allocation priority of PUCCH transmission with HARQ-ACK information and/or SR, or a power allocation priority of PUSCH transmission with HARQ-ACK information;
- a power allocation priority of PUCCH transmission with CSI or a power allocation priority of PUSCH transmission with CSI:
- a power allocation priority of PUSCH transmission without HARQ-ACK information or a power allocation priority of PUSCH transmission without CSI; or
- a power allocation priority of an SRS or the power allocation priority of the PRACH in the 4-step random access process on the non-PCell.

For example, power allocation priorities in the power allocation priority order are sequentially arranged from high to low as follows:
- the PUSCH and/or PRACH in the 2-step random access process on the PCell and/or the non-PCell:
- the PRACH in the 4-step random access process on the PCell;
- PUCCH transmission with HARQ-ACK information and/or SR, or PUSCH transmission with HARQ-ACK information;
- PUCCH transmission with CSI or PUSCH transmission with CSI:
- PUCCH transmission without HARQ-ACK information or PUSCH transmission without CSI; and
- the SRS, or the PRACH in the 4-step random access process on the non-PCell.

Optionally, the power allocation priority order is preconfigured or is configured by a network device.

It is to be understood that the steps in the method for power allocation 300 may refer to the corresponding steps in the method for power allocation 200 and, for simplicity, will not be elaborated herein.

Accordingly, in the embodiment of the disclosure, it is defined that, in the power allocation priority order, at least one of the power allocation priority of the PUSCH or the power allocation priority of the PRACH in the 2-step random access process is higher than the power allocation priority of the PRACH in the 4-step random access process on the PCell, so that the power allocation priorities of the PUSCH and/or PRACH in the 2-step random access process may be ensured, which avoids retransmission caused by the fact that the PUSCH and/or PRACH in the 2-step random access process cannot be correctly received by a network device, reduces a delay of 2-step random access, and also avoids waste of a PUSCH resource and/or a PRACH resource.

Figure 4:
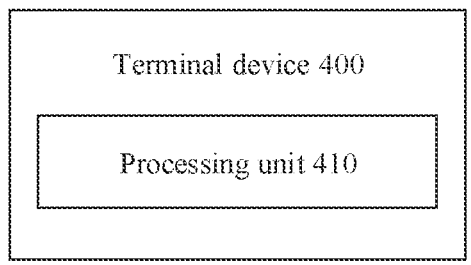
FIG. 4 is a schematic block diagram of a terminal device according to an embodiment of the disclosure.

FIG. 4 is a schematic block diagram of a terminal device 400 according to an embodiment of the disclosure. As illustrated in FIG. 4, the terminal device 400 includes a processing unit 410.

The processing unit 410 is configured to determine total transmit power at a first transmission occasion, the total transmit power being a sum of transmit power for a plurality of signals to be transmitted, and the plurality of signals to be transmitted at least including a first signal, and the first signal including at least one of a PUSCH or PRACH in a 2-step random access process.

Responsive to that the total transmit power is higher than maximum transmit power of the terminal device, the processing unit 410 is further configured to determine actual transmit power for the first signal according to at least one of a type of a cell for transmitting the first signal or a channel type of the first signal as well as a power allocation priority order, the power allocation priority order including an order of power allocation priorities of the first signal and other signals except the first signal.

Optionally, responsive to that the actual transmit power for the first signal is determined by the terminal device according to the channel type of the first signal and the power allocation priority order, the PRACH and PUSCH included in the first signal have different power allocation priorities.

Optionally, the power allocation priority of the PRACH included in the first signal is higher than the power allocation priority of the PUSCH included in the first signal.

Optionally, the actual transmit power for the first signal is specifically determined by the terminal device according to the type of the cell for transmitting the first signal, the channel type of the first signal and the power allocation priority order.

Optionally, the PRACH and PUSCH included in the first signal on a PCell have different power allocation priorities.

Optionally, the power allocation priority of the PRACH included in the first signal on the PCell is higher than the power allocation priority of the PUSCH included in the first signal on the PCell.

Optionally, the PRACH and PUSCH included in the first signal on a non-PCell have different power allocation priorities.

Optionally, the power allocation priority of the PRACH included in the first signal of the non-PCell is higher than the power allocation priority of the PUSCH included in the first signal on the non-PCell.

Optionally, the PRACH and PUSCH included in the first signal on the non-PCell have the same power allocation priority.

Optionally, the power allocation priority of the PRACH and/or the power allocation priority of the PUSCH included in the first signal on the PCell are/is higher than the power allocation priority of the PRACH and/or the power allocation priority of the PUSCH included in the first signal on the non-PCell.

Optionally, in the power allocation priority order,
the power allocation priority of the PRACH included in the first signal on the PCell is higher than or equal to a power allocation priority of a PRACH in a 4-step random access process on the PCell, and the power allocation priority of the PUSCH included in the first signal on the PCell is lower than the power allocation priority of the PRACH in the 4-step random access process on the PCell; or
the power allocation priority of the PRACH included in the first signal on the PCell is higher than the power allocation priority of the PRACH in the 4-step random access process on the PCell, and the power allocation priority of the PUSCH included in the first signal on the PCell is less than or equal to the power allocation priority of the PRACH in the 4-step random access process on the PCell.

Optionally, in the power allocation priority order, at least one of the power allocation priority of the PRACH or the power allocation priority of the PUSCH included in the first signal on the PCell is higher than at least one of:

a power allocation priority of PUCCH transmission with HARQ-ACK information and/or SR, or a power allocation priority of PUSCH transmission with HARQ-ACK information;

a power allocation priority of PUCCH transmission with CSI or a power allocation priority of PUSCH transmission with CSI:

the power allocation priority of the first signal on the non-PCell;

a power allocation priority of PUSCH transmission without HARQ-ACK information or a power allocation priority of PUSCH transmission without CSI; or a power allocation priority of an SRS, or the power allocation priority of the PRACH in the 4-step random access process on the non-PCell.

Optionally, in the power allocation priority order, at least one of the power allocation priority of the PRACH or the power allocation priority of the PUSCH included in the first signal on the non-PCell is lower than at least one of:

the power allocation priority of the PRACH and/or the power allocation priority of the PUSCH included in the first signal on the PCell;

the power allocation priority of the PRACH in the 4-step random access process on the PCell;

the power allocation priority of PUCCH transmission with HARQ-ACK information and/or SR, or the power allocation priority of PUSCH transmission with HARQ-ACK information; or the power allocation priority of PUCCH transmission with CSI or the power allocation priority of PUSCH transmission with CSI.

Optionally, in the power allocation priority order, at least one of the power allocation priority of the PRACH or the power allocation priority of the PUSCH included in the first signal on the non-PCell is higher than at least one of:

the power allocation priority of PUSCH transmission without HARQ-ACK information, or the power allocation priority of PUSCH transmission without CSI; or the power allocation priority of the SRS, or the power allocation priority of the PRACH in the 4-step random access process on the non-PCell.

Optionally, responsive to that the actual transmit power for the first signal is determined by the terminal device according to the type of the cell for transmitting the first signal and the power allocation priority order, the power allocation priority of the first signal on the PCell is higher than the power allocation priority of the first signal on the non-PCell.

Optionally, in the power allocation priority order, the power allocation priority of the first signal on the non-PCell is less than or equal to the power allocation priority of the PRACH in the 4-step random access process on the PCell.

Optionally, in the power allocation priority order, the power allocation priority of the first signal on the non-PCell is higher than or equal to at least one of:

the power allocation priority of PUSCH transmission without HARQ-ACK information or the power allocation priority of PUSCH transmission without CSI:

the power allocation priority of PUSCH transmission with HARQ-ACK information or the power allocation priority of PUSCH transmission with CSI;

the power allocation priority of the SRS; or the power allocation priority of the PRACH in the 4-step random access process on the non-PCell.

Optionally, in the power allocation priority order, the power allocation priority of the first signal on the non-PCell is less than or equal to at least one of:

the power allocation priority of PUCCH transmission with HARQ-ACK information and/or SR, or the power allocation priority of PUSCH transmission with HARQ-ACK information; or the power allocation priority of PUCCH transmission with CSI or the power allocation priority of PUSCH transmission with CSI.

Optionally, in the power allocation priority order, the power allocation priority of the first signal on the PCell is higher than or equal to the power allocation priority of the PRACH in the 4-step random access process on the PCell, and/or the power allocation priority of the first signal on the non-PCell is higher than or equal to the power allocation priority of the PRACH in the 4-step random access process on the non-PCell.

Optionally, in the power allocation priority order, the power allocation priority of the first signal on the PCell is higher than at least one of:

the power allocation priority of the PRACH in the 4-step random access process on the PCell;

the power allocation priority of PUCCH transmission with HARQ-ACK information and/or SR, or the power allocation priority of PUSCH transmission with HARQ-ACK information; and the power allocation priority of PUCCH transmission with CSI or the power allocation priority of PUSCH transmission with CSI;

the power allocation priority of the first signal on the non-PCell;

the power allocation priority of PUSCH transmission without HARQ-ACK information or the power allocation priority of PUSCH transmission without CSI; or the power allocation priority of the SRS or the power allocation priority of the PRACH in the 4-step random access process on the non-PCell.

It is to be understood that the terminal device 400 according to the embodiment of the disclosure may correspond to the terminal device in the method embodiment of the disclosure. The abovementioned and other operations and/or functions of respective units in the terminal device 400 are adopted to implement the corresponding flows executed by the terminal device in the method 200 illustrated in FIG. 2 respectively, and will not be elaborated herein for simplicity.

Figure 5:
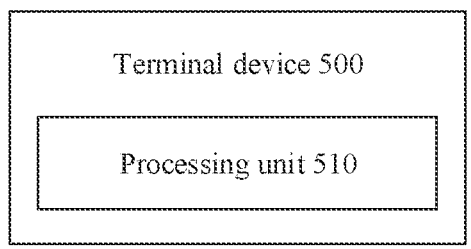
FIG. 5 is a schematic block diagram of another terminal device according to an embodiment of the disclosure.

FIG. 5 is a schematic block diagram of a terminal device 500 according to an embodiment of the disclosure. As illustrated in FIG. 5, the terminal device 500 includes a processing unit 510.

The processing unit 510 is configured to determine total transmit power at a first transmission occasion, the total transmit power being a sum of transmit power for a plurality of signals to be transmitted, and the plurality of signals to be transmitted at least including at least one of a PUSCH or PRACH in a 2-step random access process, and a PRACH in a 4-step random access process.

Responsive to that the total transmit power is higher than maximum transmit power of the terminal device, the processing unit 510 is further configured to determine actual transmit power for the plurality of signals to be transmitted according to a power allocation priority order respectively, wherein in the power allocation priority order, at least one of a power allocation priority of the PUSCH or a power allocation priority of the PRACH in the 2-step random access process is higher than a power allocation priority of the PRACH in the 4-step random access process on a PCell.

Optionally, in the power allocation priority order, at least one of the power allocation priority of the PRACH or the power allocation priority of the PUSCH in the 2-step random access process is higher than the power allocation priority of the PRACH in the 4-step random access process on the PCell.

Optionally, in the power allocation priority order, at least one of the power allocation priority of the PUSCH or the power allocation priority of the PRACH in the 2-step random access process on the PCell and/or the non-PCell is higher than at least one of:

the priority of the PRACH in the 4-step random access process on the PCell;

a power allocation priority of PUCCH transmission with HARQ-ACK information and/or SR, or a power allocation priority of PUSCH transmission with HARQ-ACK information; and a power allocation priority of PUCCH transmission with CSI or a power allocation priority of PUSCH transmission with CSI;

a power allocation priority of PUSCH transmission without HARQ-ACK information or a power allocation priority of PUSCH transmission without CSI; or a power allocation priority of an SRS or the power allocation priority of the PRACH in the 4-step random access process on the non-PCell.

Optionally, the power allocation priority order is preconfigured, or is configured by a network device.

It is to be understood that the terminal device 500 according to the embodiment of the disclosure may correspond to the terminal device in the method embodiment of the disclosure. The abovementioned and other operations and/or functions of respective units in the terminal device 400 are adopted to implement the corresponding flows executed by the terminal device in the method 30) illustrated in FIG. 3 respectively, and will not be elaborated herein for simplicity.

Figure 6:
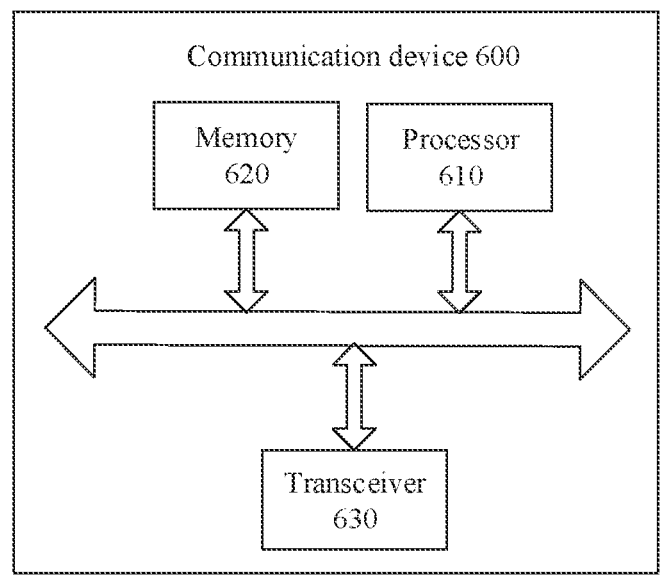
FIG. 6 is a schematic block diagram of a communication device according to an embodiment of the disclosure.

FIG. 6 is a schematic structure diagram of a communication device 600 according to an embodiment of the disclosure. The communication device 600 illustrated in FIG. 6 includes a processor 610, and the processor 610 may call and run a computer program in a memory to implement the method in the embodiments of the disclosure.

Optionally, as illustrated in FIG. 6, the communication device 600 may further include the memory 620. The processor 610 may call and run the computer program in the memory 620 to implement the method in the embodiments of the disclosure.

The memory 620 may be an independent device independent of the processor 610, or may be integrated into the processor 610.

Optionally, as illustrated in FIG. 6, the communication device 600 may further include a transceiver 630. The processor 610 may control the transceiver 630 to communicate with another device, specifically transmitting information or data to the another device or receiving information or data transmitted by the another device.

The transceiver 630 may include a transmitter and a receiver. The transceiver 630 may further include antennae, and the number of the antennae may be one or more.

Optionally, the communication device 600 may specifically be the mobile terminal/terminal device of the embodiments of the disclosure, and the communication device 600 may implement corresponding flows implemented by the mobile terminal/terminal device in each method of the embodiments of the disclosure. For simplicity, elaborations are omitted herein.

Optionally, the communication device 600 may specifically be the network device of the embodiments of the disclosure, and the communication device 600 may implement corresponding flows implemented by the network device in each method of the embodiments of the disclosure. For simplicity, elaborations are omitted herein.

Figure 7:
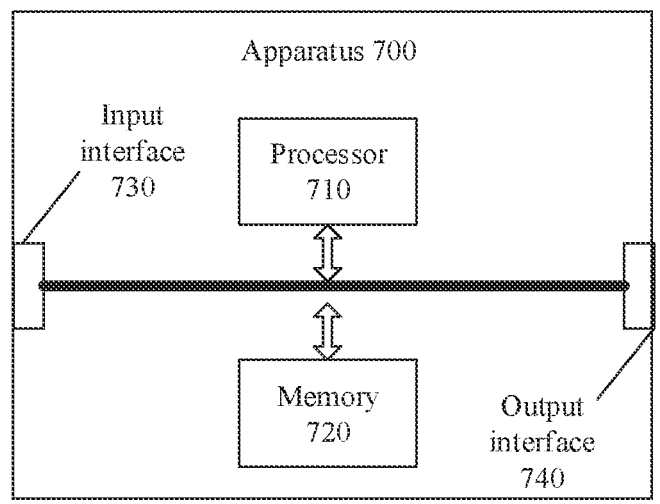
FIG. 7 is a schematic block diagram of an apparatus according to an embodiment of the disclosure.

FIG. 7 is a schematic structure diagram of an apparatus according to an embodiment of the disclosure. The apparatus 700 illustrated in FIG. 7 includes a processor 710, and the processor 710 may call and run a computer program in a memory to implement the method in the embodiments of the disclosure.

Optionally, as illustrated in FIG. 7, the apparatus 700 may further include the memory 720. The processor 710 may call and run the computer program in the memory 720 to implement the method in the embodiments of the disclosure.

The memory 720 may be an independent device independent of the processor 710, or may be integrated into the processor 710.

Optionally, the apparatus 700 may further include an input interface 730. The processor 710 may control the input interface 730 to communicate with another device or chip, specifically acquiring information or data transmitted by the another device or chip.

Optionally, the apparatus 700 may further include an output interface 740. The processor 710 may control the output interface 740 to communicate with another device or chip, specifically outputting information or data transmitted by the another device or chip.

Optionally, the apparatus may be applied to the network device of the embodiments of the disclosure, and the apparatus may implement corresponding flows implemented by the network device in each method of the embodiments of the disclosure. For simplicity, elaborations are omitted herein.

Optionally, the apparatus may be applied to the mobile terminal/terminal device of the embodiment of the disclosure, and the apparatus may implement corresponding flows implemented by the mobile terminal/terminal device in each method of the embodiment of the disclosure. For simplicity, elaborations are omitted herein.

Optionally, the apparatus mentioned in the embodiment of the disclosure may also be a chip, and for example, may be a system-level chip, a system chip, a chip system or a chip on system.

Figure 8:
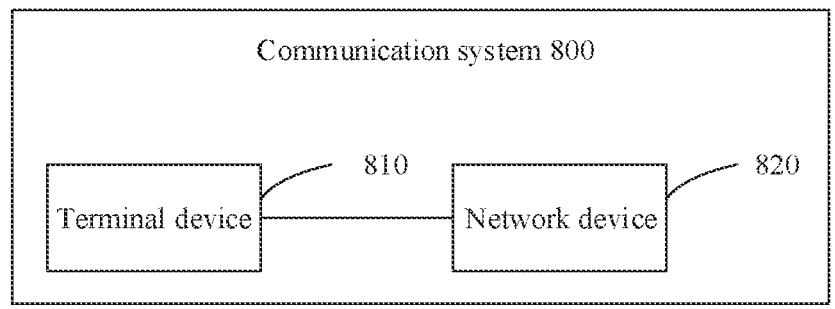
FIG. 8 is a schematic block diagram of a communication system according to an embodiment of the disclosure.

FIG. 8 is a second block diagram of a communication system 800 according to an embodiment of the disclosure. As illustrated in FIG. 8, a communication system 800 includes a terminal device 810 and a network device 820.

The terminal device 810 may be configured to realize corresponding functions realized by the terminal device in the method, and the network device 820 may be configured to realize corresponding functions realized by the network device in the method. For simplicity, elaborations are omitted herein.

It is to be understood that the processor in the embodiment of the disclosure may be an integrated circuit chip and has a signal processing capacity. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

The embodiments of the disclosure also provide a computer-readable storage medium, which is configured to store a computer program.

Optionally, the computer-readable storage medium may be applied to a network device in the embodiments of the disclosure, and the computer program enables a computer to execute corresponding flows implemented by the network device in each method of the embodiments of the disclosure. For simplicity, elaborations are omitted herein.

Optionally, the computer-readable storage medium may be applied to a mobile terminal/terminal device in the embodiments of the disclosure, and the computer program enables a computer to execute corresponding flows implemented by the mobile terminal/terminal device in each method of the embodiments of the disclosure. For simplicity, elaborations are omitted herein.

The embodiments of the disclosure also provide a computer program product, which includes computer program instructions.

Optionally, the computer program product may be applied to a network device in the embodiments of the disclosure, and the computer program instructions enable a computer to execute corresponding flows implemented by the network device in each method of the embodiments of the disclosure. For simplicity, elaborations are omitted herein.

Optionally, the computer program product may be applied to a mobile terminal/terminal device in the embodiments of the disclosure, and the computer program instructions enable the computer to execute corresponding flows implemented by the mobile terminal/terminal device in each method of the embodiments of the disclosure. For simplicity, elaborations are omitted herein.

The embodiments of the disclosure also provide a computer program.

Optionally, the computer program may be applied to a network device in the embodiments of the disclosure, and the computer program runs in a computer to enable the computer to execute corresponding flows implemented by the network device in each method of the embodiments of the disclosure. For simplicity, elaborations are omitted herein.

Optionally, the computer program may be applied to a mobile terminal/terminal device in the embodiments of the disclosure, and the computer program runs in the computer to enable the computer to execute corresponding flows implemented by the mobile terminal/terminal device in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, a plurality of units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to a plurality of network units. Part or all of the units may be selected to achieve the purpose of the solutions of the embodiments according to a practical requirement.

In addition, each functional unit in each embodiment of the disclosure may be integrated into a processing unit, or each unit may physically exist independently, or two or more than two units may be integrated into a unit.

When being realized in form of software functional unit and sold or used as an independent product, the function may also be stored in a computer-readable storage medium. For such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for power allocation, comprising:
determining, by a terminal device, total transmit power at a first transmission occasion, the total transmit power being a sum of transmit power for a plurality of signals to be transmitted, the plurality of signals to be transmitted at least comprising a first signal, the first signal being a message (Msg) A in a 2-step random access process, and the first signal comprising at least one of a Physical Uplink Shared Channel (PUSCH) in the 2-step random access process or Physical Random Access Channel (PRACH) in the 2-step random access process; and
responsive to that the total transmit power is higher than maximum transmit power of the terminal device, determining, by the terminal device, actual transmit power for the first signal according to at least one of a type of a cell for transmitting the first signal or a channel type of the first signal as well as a power allocation priority order, the power allocation priority order comprising an order of power allocation priorities of the first signal and other signals except the first signal,
wherein responsive to that the actual transmit power for the first signal is determined by the terminal device according to the channel type of the first signal and the power allocation priority order, the PRACH and PUSCH comprised in the first signal have different power allocation priorities, and
wherein in the power allocation priority order, at least one of a power allocation priority of the PRACH or a power allocation priority of the PUSCH comprised in the first signal on a Primary Cell (PCell) is higher than at least one of:
a power allocation priority of Physical Uplink Control Channel (PUCCH) transmission with at least one of Hybrid Automatic Repeat reQuest Acknowledgement (HARQ-ACK) information or Scheduling Request (SR) or a power allocation priority of PUSCH transmission with HARQ-ACK information;
a power allocation priority of PUCCH transmission with Channel State Information (CSI) or a power allocation priority of PUSCH transmission with CSI;

a power allocation priority of PUSCH transmission without HARQ-ACK information or a power allocation priority of PUSCH transmission without CSI; or a power allocation priority of a Sounding Reference Signal (SRS) or the power allocation priority of the PRACH in the 4-step random access process on a non-PCell.

2. The method of claim 1, wherein the power allocation priority of the PRACH comprised in the first signal is higher than the power allocation priority of the PUSCH comprised in the first signal.

3. The method of claim 1, wherein the actual transmit power for the first signal is determined by the terminal device according to the type of the cell for transmitting the first signal, the channel type of the first signal and the power allocation priority order.

4. The method of claim 3, wherein
the PRACH and PUSCH comprised in the first signal on the PCell have different power allocation priorities.

5. The method of claim 4, wherein a power allocation priority of the PRACH comprised in the first signal on the PCell is higher than a power allocation priority of the PUSCH comprised in the first signal on the PCell.

6. The method of claim 1, wherein in the power allocation priority order,
the power allocation priority of the PRACH comprised in the first signal on the PCell is higher than or equal to a power allocation priority of a PRACH in a 4-step random access process on the PCell, and the power allocation priority of the PUSCH comprised in the first signal on the PCell is lower than the power allocation priority of the PRACH in the 4-step random access process on the PCell.

7. A terminal device, comprising: a processor and a memory, wherein the memory is configured to store a computer program, and the processor is configured to call and run the computer program stored in the memory to execute operations of:
determining total transmit power at a first transmission occasion, the total transmit power being a sum of transmit power for a plurality of signals to be transmitted, the plurality of signals to be transmitted at least comprising a first signal, the first signal being a message (Msg) A in a 2-step random access process, and the first signal comprising at least one of a Physical Uplink Shared Channel (PUSCH) in the 2-step random access process or Physical Random Access Channel (PRACH) in the 2-step random access process, wherein responsive to that the total transmit power is higher than maximum transmit power of the terminal device, the processor is further configured to determine actual transmit power for the first signal according to at least one of a type of a cell for transmitting the first signal or a channel type of the first signal as well as a power allocation priority order, the power allocation priority order comprising an order of power allocation priorities of the first signal and other signals except the first signal, wherein responsive to that the actual transmit power for the first signal is determined by the terminal device according to the channel type of the first signal and the power allocation priority order, the PRACH and PUSCH comprised in the first signal have different power allocation priorities, and wherein in the power allocation priority order, at least one of a power allocation priority of the PRACH or a power allocation priority of the PUSCH comprised in the first signal on a Primary Cell (PCell) is higher than at least one of:

a power allocation priority of Physical Uplink Control Channel (PUCCH) transmission with at least one of Hybrid Automatic Repeat reQuest Acknowledgement (HARQ-ACK) information or Scheduling Request (SR) or a power allocation priority of PUSCH transmission with HARQ-ACK information;

a power allocation priority of PUCCH transmission with Channel State Information (CSI) or a power allocation priority of PUSCH transmission with CSI;

a power allocation priority of PUSCH transmission without HARQ-ACK information or a power allocation priority of PUSCH transmission without CSI; or a power allocation priority of a Sounding Reference Signal (SRS) or the power allocation priority of the PRACH in the 4-step random access process on a non-PCell.

8. The terminal device of claim 7, wherein the power allocation priority of the PRACH comprised in the first signal is higher than the power allocation priority of the PUSCH comprised in the first signal.

9. The terminal device of claim 7, wherein the actual transmit power for the first signal is determined by the terminal device according to the type of the cell for transmitting the first signal, the channel type of the first signal and the power allocation priority order.

10. The terminal device of claim 9, wherein
the PRACH and PUSCH comprised in the first signal on the PCell have different power allocation priorities.

11. The terminal device of claim 10, wherein a power allocation priority of the PRACH comprised in the first signal on the PCell is higher than a power allocation priority of the PUSCH comprised in the first signal on the PCell.

12. The terminal device of claim 7, wherein in the power allocation priority order,
the power allocation priority of the PRACH comprised in the first signal on the PCell is higher than or equal to a power allocation priority of a PRACH in a 4-step random access process on the PCell, and the power allocation priority of the PUSCH comprised in the first signal on the PCell is lower than the power allocation priority of the PRACH in the 4-step random access process on the PCell.

13. A non-transitory computer-readable storage medium, configured to store a computer program, the computer program enabling a computer to execute operations of:
determining, by a terminal device, total transmit power at a first transmission occasion, the total transmit power being a sum of transmit power for a plurality of signals to be transmitted, the plurality of signals to be transmitted at least comprising a first signal, the first signal being a message (Msg) A in a 2-step random access process, and the first signal comprising at least one of a Physical Uplink Shared Channel (PUSCH) in the 2-step random access process or Physical Random Access Channel (PRACH) in the 2-step random access process; and responsive to that the total transmit power is higher than maximum transmit power of the terminal device, determining, by the terminal device, actual transmit power for the first signal according to at least one of a type of a cell for transmitting the first signal or a channel type of the first signal as well as a power allocation priority order, the power allocation priority order comprising an order of power allocation priorities of the first signal and other signals except the first signal, wherein responsive to that the actual transmit power for the first signal is determined by the terminal device according to the channel type of the first signal and the power allocation priority order, the PRACH and PUSCH comprised in the first signal have different power allocation priorities, and wherein in the power allocation priority order, at least one of a power allocation priority of the PRACH or a power allocation priority of the PUSCH comprised in the first signal on a Primary Cell (PCell) is higher than at least one of:

a power allocation priority of Physical Uplink Control Channel (PUCCH) transmission with at least one of Hybrid Automatic Repeat reQuest Acknowledgement (HARQ-ACK) information or Scheduling Request (SR) or a power allocation priority of PUSCH transmission with HARQ-ACK information;

a power allocation priority of PUCCH transmission with Channel State Information (CSI) or a power allocation priority of PUSCH transmission with CSI;

a power allocation priority of PUSCH transmission without HARQ-ACK information or a power allocation priority of PUSCH transmission without CSI; or a power allocation priority of a Sounding Reference Signal (SRS) or the power allocation priority of the PRACH in the 4-step random access process on a non-PCell.

14. The non-transitory computer-readable storage medium of claim 13, wherein the power allocation priority of the PRACH comprised in the first signal is higher than the power allocation priority of the PUSCH comprised in the first signal.

15. The non-transitory computer-readable storage medium of claim 13, wherein the actual transmit power for the first signal is determined by the terminal device according to the type of the cell for transmitting the first signal, the channel type of the first signal and the power allocation priority order.

\* \* \* \* \*